US012305864B2

(12) United States Patent
Paller

(10) Patent No.: US 12,305,864 B2
(45) Date of Patent: May 20, 2025

(54) OVEN APPLIANCE INCLUDING A HIGH TEMPERATURE COOKING ZONE

(71) Applicant: Haier US Appliance Solutions, Inc., Wilmington, DE (US)

(72) Inventor: Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 436 days.

(21) Appl. No.: 17/742,646

(22) Filed: May 12, 2022

(65) Prior Publication Data
US 2023/0366562 A1 Nov. 16, 2023

(51) Int. Cl.
*F24C 15/32* (2006.01)
*F24C 3/08* (2006.01)

(52) U.S. Cl.
CPC .............. *F24C 15/32* (2013.01); *F24C 3/087* (2013.01)

(58) Field of Classification Search
CPC .......... F24C 3/008; F24C 3/087; F24C 15/16; F24C 15/18; F24C 15/32
USPC ...................................................... 126/39 R
See application file for complete search history.

(56) References Cited

U.S. PATENT DOCUMENTS

| 3,603,241 | A | * | 9/1971 | Drucker | ................. F24C 15/16 99/335 |
| 4,415,788 | A | * | 11/1983 | Field | ................... H05B 6/1263 219/452.12 |
| 4,718,400 | A | * | 1/1988 | Lotz | ........................ F24C 3/008 126/41 R |
| 10,101,038 | B2 | | 10/2018 | Kim et al. | |
| 2002/0017290 | A1 | * | 2/2002 | Hines, Jr. | ............. A47J 37/0786 126/41 R |
| 2015/0323190 | A1 | * | 11/2015 | Stein | ...................... F24B 1/003 219/390 |
| 2021/0222889 | A1 | | 7/2021 | Johnson et al. | |

FOREIGN PATENT DOCUMENTS

| KR | 100307352 B1 | 12/2001 |
| KR | 20090007519 U | 7/2009 |

* cited by examiner

*Primary Examiner* — Avinash A Savani
(74) *Attorney, Agent, or Firm* — Dority & Manning, P.A.

(57) ABSTRACT

A cooking accessory receivable within a cooking chamber of an oven appliance includes a base plate to receive a food item thereon, and an enclosing lid disposed over the base plate. The enclosing lid defines a main inlet and an access opening, the main inlet being defined along the vertical direction and the access opening being defined along the transverse direction. The base plate and the enclosing lid form a high heat chamber for the food item, the high heat chamber being in fluid communication with the cooking chamber.

17 Claims, 4 Drawing Sheets

OVEN APPLIANCE INCLUDING A HIGH TEMPERATURE COOKING ZONE

FIELD OF THE INVENTION

The present subject matter relates generally to oven appliances, and more particularly to built-in high heat zones within oven appliances.

BACKGROUND OF THE INVENTION

Conventional ovens are household appliances used to cook or reheat food items or cooking utensils, such as baking dishes or pans. A user may place a food item or cooking utensil into an oven cavity to be heated. For example, certain oven appliances include heating elements such as an electrical heating element or a gas burner. The food item or cooking utensil may be heated by conduction, convection, or radiation.

Some conventional ovens have a gas burner typically placed at the bottom of the oven cavity (e.g., beneath a lower wall or bottom plate of a cooking chamber). Outlet ports on the gas burner may face or supply heat to a bottom panel of the oven cavity, which may include one or more outlets providing fluid communication to the oven cavity. However, conventional heat sources and oven designs are only capable of safely reaching a limited temperature within the oven cavity, which restricts certain operations from being performed to desired results.

Accordingly, an oven appliance which obviates one or more of the above-mentioned drawbacks would be desirable. In particular, a built-in high heat cooking zone within an oven cavity would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking accessory provided within a cooking chamber of an oven appliance is provided. The cooking accessory may include a base plate to receive a food item thereon, and an enclosing lid disposed over the base plate, the enclosing lid defining a main inlet and an access opening. The main inlet may be defined along the vertical direction and the access opening may be defined along the transverse direction. The base plate and the enclosing lid may form a high heat chamber for the food item, the high heat chamber being in fluid communication with the cooking chamber.

In another exemplary aspect of the present disclosure, an oven appliance is provided. The oven appliance may include a cabinet forming a cooking chamber and a heating element chamber provided below the cooking chamber, a heating element provided within the heating element chamber, and a cooking accessory positioned between the heating element chamber and the cooking chamber. The cooking accessory may include a base plate, and an enclosing lid disposed over the base plate, the enclosing lid defining a main inlet and an access opening. The main inlet may be defined along the vertical direction and the access opening may be defined along the transverse direction. The cooking accessory may form a bottom panel of the cooking chamber. The cooking accessory may form a high heat chamber in fluid communication with the cooking chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
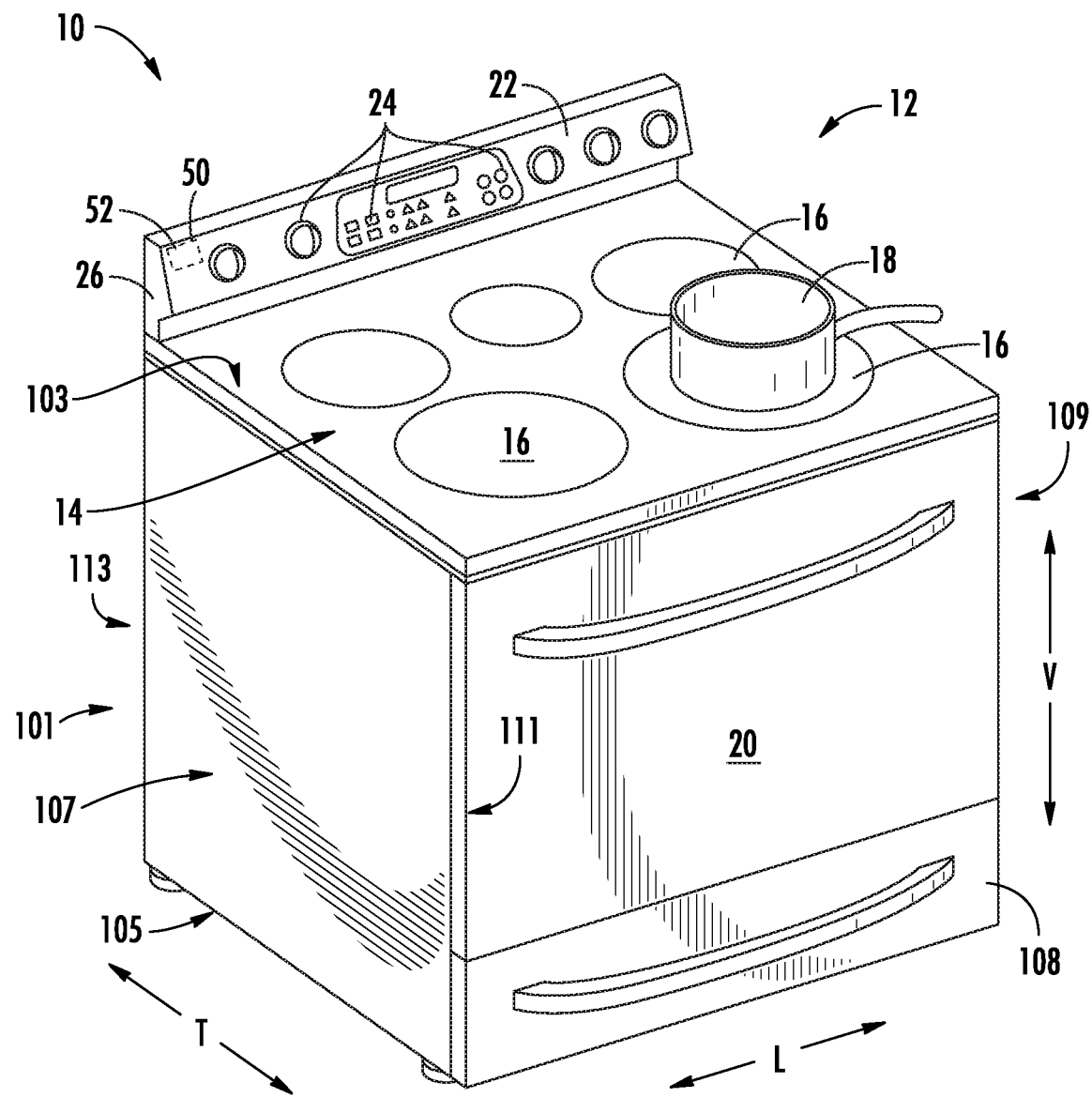
FIG. 1 provides a perspective view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
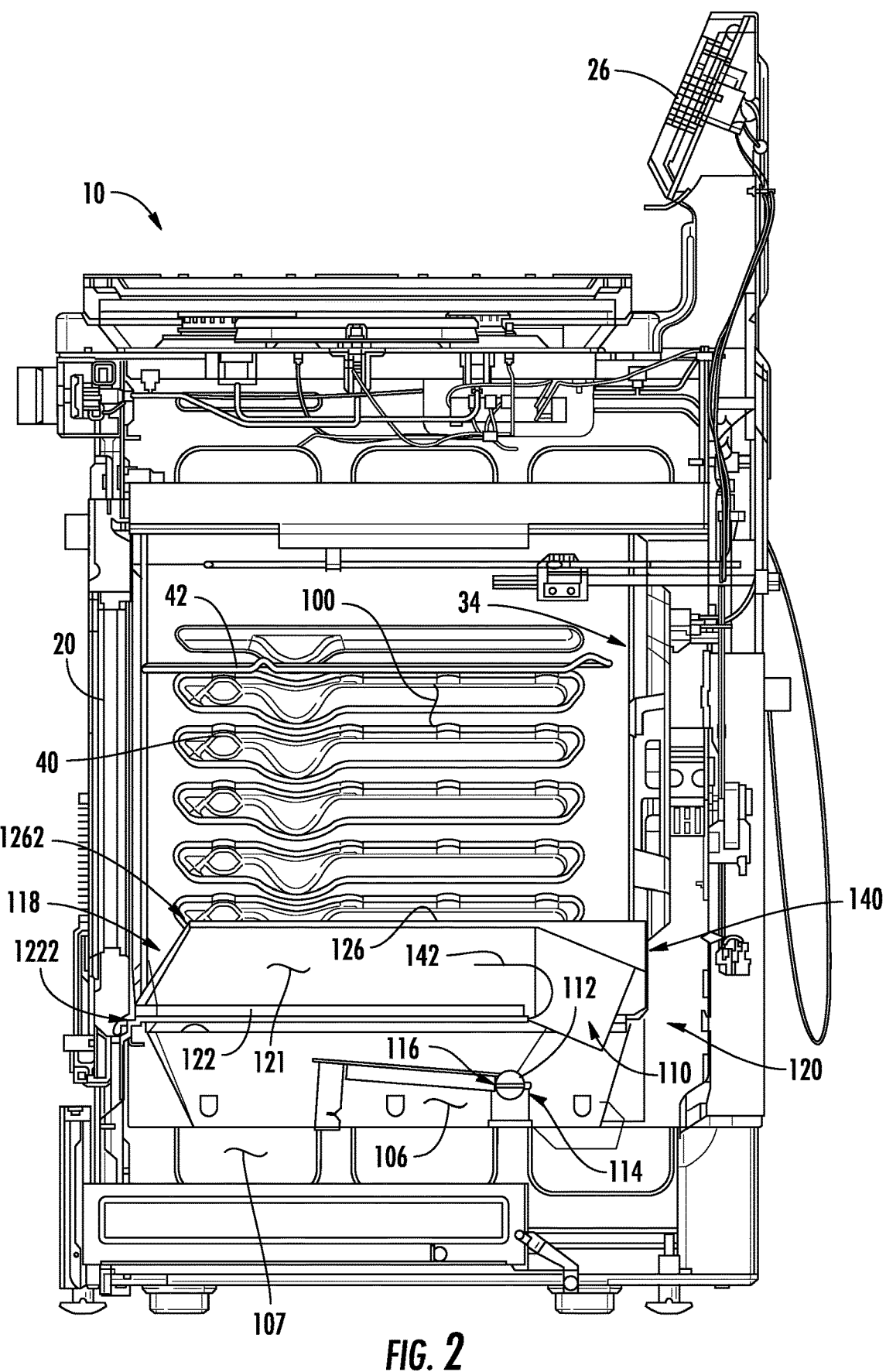
FIG. 2 provides a side section view of the exemplary oven appliance of FIG. 1.

FIG. 1 provides a perspective view of an oven appliance, or oven range 10, including a cooktop 12, and FIG. 2 provides a side cut-away view of the oven appliance. Oven appliance 10 is provided by way of example only and is not intended to limit the present subject matter to the arrangement shown in FIGS. 1 and 2. Thus, the present subject matter may be used with other range and/or cooktop configurations, e.g., double oven range appliances. As illustrated, oven appliance 10 generally defines a vertical direction V, a lateral direction L, and a transverse direction T, each of which is mutually perpendicular, such that an orthogonal coordinate system is generally defined. Oven appliance 10 includes a cabinet 101 that extends between a top 103 and a bottom 105 along the vertical direction V, between a left side 107 and a right side 109 along the lateral direction, and between a front 111 and a rear 113 along the transverse direction T.

Cabinet 101 may include a cooking chamber 100. For instance, cooking chamber 100 may be defined by a plurality of sidewalls including opposing sidewalls 30 (FIG. 2), bottom wall 32 (described in more detail below), back wall 34, and top wall 36 that define cooking chamber 100. Bottom wall 32 and top wall 36 are spaced apart along the vertical direction V, and sidewalls 30 extend along the vertical direction V between top wall 36 and bottom wall 32. Back wall 34 extends between sidewalls 30 along the lateral direction L and also extends between top wall 36 and bottom wall 32 along the vertical direction V.

Sidewalls 30 may include supports 40 (FIG. 2) for supporting oven racks 42 (FIG. 2) that may be selectively positioned within chamber 100. Oven racks 42 may include a top rack and a bottom rack. Top rack 42 is positioned above bottom rack 42 along the vertical direction V. Additional supports 40 may be provided at or near a bottom of cooking chamber 100 to support bottom wall 32, which will be described in further detail below. Moreover, additional racks may be included within cooking chamber 100, such as one or more intermediate racks.

The oven appliance 10 may also include a door 20 with handle that provides for opening and closing access to a cooking chamber 100. A user of the oven appliance 10 can place a variety of different items to be cooked in chamber 100 onto racks 40. Heating elements (e.g., burner 112 described below) may be positioned at the top and the bottom of chamber 100 to provide heat for cooking and cleaning. Such heating element(s) can be e.g., gas, electric, microwave, or a combination thereof. Other heating elements (not shown) could be located at other locations as well. A window 110 on door 20 allows the user to view e.g., food items during the cooking process.

Bottom wall 32 may divide cabinet 101 into cooking chamber 100 and a burner housing 106. In some embodiments, burner housing 106 is provided below cooking chamber 100 (e.g., under bottom wall 32). Bottom wall 32 may include an outlet port defined therein. In some embodiments, the outlet port is provided at or near a rear of bottom wall 32 (e.g., proximate a rear of oven appliance 10 opposite door 20). The outlet port may allow fluid communication between cooking chamber 100 and burner housing 106 through the bottom wall. For example, air heated in burner housing 106 may pass into cooking chamber 100 via the outlet port.

Although a single outlet port is illustrated and described herein, it should be appreciated that any suitable, number, size, position, and configuration of outlet ports could be used while remaining within the scope of the present subject matter. For example, in some embodiments, multiple outlet ports may be defined in bottom wall 32. In these embodiments, the outlet ports may be spaced apart from each other in the lateral direction L. Additionally or alternatively, as will be explained in more detail below, a of outlet ports in fluid series with each other may be provided.

Oven appliance 10 may include a burner 112. Burner 112 may be provided beneath bottom wall 32 (e.g., within burner housing 106). Burner 112 may be a gas burner (e.g., a burner using a gas fuel to create a flame to produce heat). However, it should be understood that any suitable or heat source may be utilized or incorporated. Burner 112 may have any suitable shape, for example, cylindrical, pancake (e.g., flat), square, etc. Burner 112 may be oriented such that a longitudinal axis of burner 112 extends in the lateral direction L. As such, burner 112 may define a first end proximate a first lateral side of cooking chamber 100 and a second end opposite the first end and proximate a second lateral side of cooking chamber 100. Further, burner 112 may be provided in plurality under bottom wall 32. For example, two burners 112 may be provided and spaced apart from each other along the lateral direction L. For another example, two burners 112 may be provided and spaced apart from each other along the transverse direction T (e.g., a first burner at a rear of cooking chamber 100 and a second burner at a front of cooking chamber 100).

Burner 112 may include a plurality of first gas ports 114. The plurality of first gas ports 114 may be defined in an outer surface of burner 112. In one example, when burner 112 is a cylindrical burner, first gas ports 114 are defined in the circumferential surface of burner 112. In another example, when burner 112 is a pancake burner, first gas ports 114 are defined in a side panel of burner 112. According to an exemplary embodiment, first gas ports 14 may face toward the outlet port or may otherwise direct a flame and/or heated gas toward the outlet port. For example, according to the illustrated embodiment, first gas ports 114 may face substantially toward the rear of burner housing 106, e.g., such that the outlet port is positioned between burner 112 and a rear wall of burner housing 106 along the transverse direction T.

Burner 112 may further include a plurality of second gas ports 116. The plurality of second gas ports 116 may be defined in an outer surface of burner 112. In one example, when burner 112 is a cylindrical burner, second gas ports 116 are defined in the circumferential surface of burner 112. In another example, when burner 112 is a pancake burner, second gas ports 116 are defined in a side panel of burner 112. Second gas ports 116 may face substantially toward the front of burner housing 106 (e.g., toward the door 20) and away from the outlet port. The plurality of second gas ports 116 may be fewer in number than the plurality of first gas ports 114 (e.g., there may be a fewer total number of second gas ports 116 than first gas ports 114). Additionally or alternatively, a size of each of the plurality of second gas ports 116 may be smaller than a size of each of the plurality of first gas ports 114. The size of each of first gas ports 114 and second gas ports 116 may be measured by gas port area (e.g., a cross-sectional area of the gas port).

A cooking surface 14 of cooktop 12 may include a plurality of heating elements 16. For the embodiment depicted, the cooktop 12 includes five heating elements 16 spaced along cooking surface 14. The heating elements 16 are generally electric heating elements and are positioned at, e.g., on or proximate to, the cooking surface 14. In certain exemplary embodiments, cooktop 12 may be a radiant cooktop with resistive heating elements or coils mounted below cooking surface 14. However, in other embodiments, the cooktop appliance 12 may include any other suitable shape, configuration, and/or number of heating elements 16, for example, the cooktop 12 may be an open coil cooktop with the heating elements 16 positioned on or above surface 14. Additionally or alternatively, in other embodiments, the cooktop 12 may include any other suitable type of heating element 16, such as an induction heating element. Each of the heating elements 16 may be the same type of heating element 16, or cooktop 12 may include a combination of different types of heating elements 16.

A control panel 22 having controls 24 may permit a user to make selections for cooking of food items (e.g., within cooking chamber 100 or on cooking surface 14). Although shown on a backsplash or back panel 26 of oven appliance 10, control panel 22 may be positioned in any suitable location. Controls 24 may include buttons, knobs, and the like, as well as combinations thereof, and/or controls 24 may be implemented on a remote user interface device such as a smartphone. As an example, a user may manipulate one or more controls 24 to select a temperature and/or a heat or power output for each heating element 16 and the cooking chamber 100. The selected temperature or heat output of heating element 16 affects the heat transferred to cooking utensil 18 placed on heating element 16.

The cooktop appliance 12 includes a control system 50 for controlling one or more of the plurality of heating elements 16 and the cooking chamber 100. Specifically, the control system 50 may include a controller 52 operably connected to the control panel 22 and controls 24. The controller 52 may be operably connected to each of the plurality of heating elements 16 for controlling a power supply to each of the plurality of heating elements 16 in response to one or more user inputs received through the control panel 22 and controls 24.

The cooktop appliance 12 may include a drawer recess 104, into which a drawer assembly 108 may be inserted.

Drawer recess 104 may be provided underneath cooking chamber 100, for example. A user may store various items (e.g., cooking utensils 18 or the like) within drawer recess 104. Additionally or alternatively, drawer recess 104 may be used as a temporary storage area for food (e.g., as a warming zone or area). According to some embodiments, drawer recess 104 may be an additional cooking or baking zone, in which food items may be cooked or baked. It should be noted that drawer recess 104 may be used for any suitable purposes, and the disclosure is not limited to those examples given herein. An opening to drawer recess 104 may be defined in the lateral direction L and vertical direction V. In detail, drawer recess 104 may be configured such that drawer assembly 108 is withdrawn in the transverse direction T from drawer recess 104.

Figure 3:
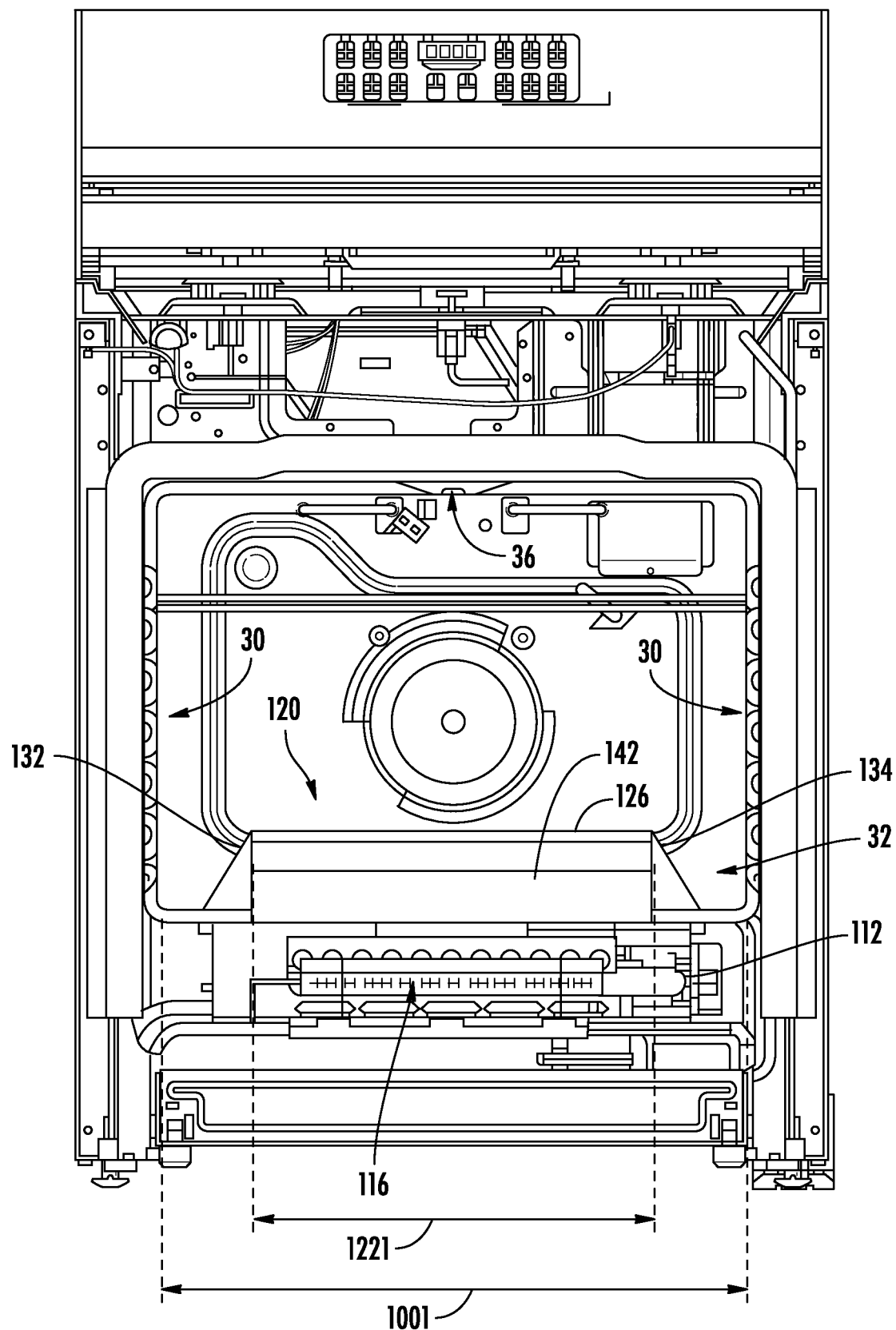
FIG. 3 provides a front view of the exemplary oven appliance of FIG. 1
Figure 4:
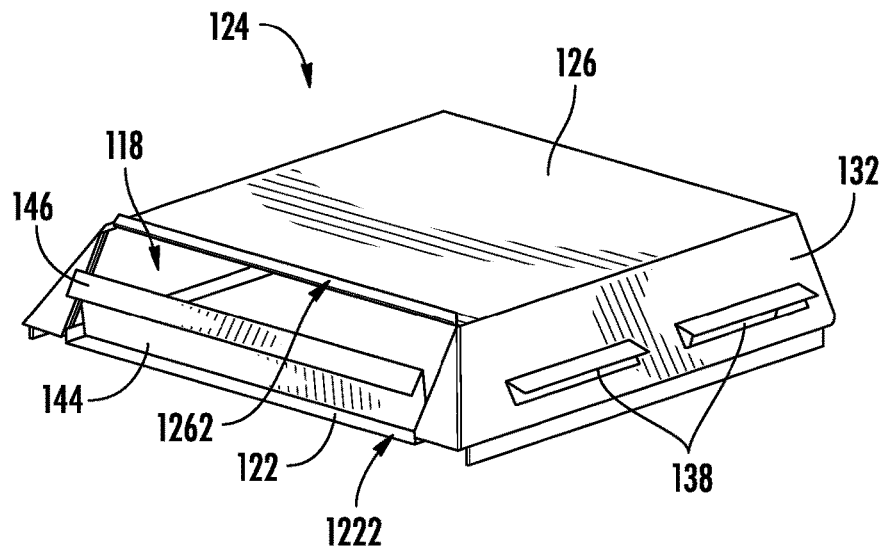
FIG. 4 provides a perspective view of a high temperature cooking zone according to exemplary embodiments of the present disclosure.
Figure 5:
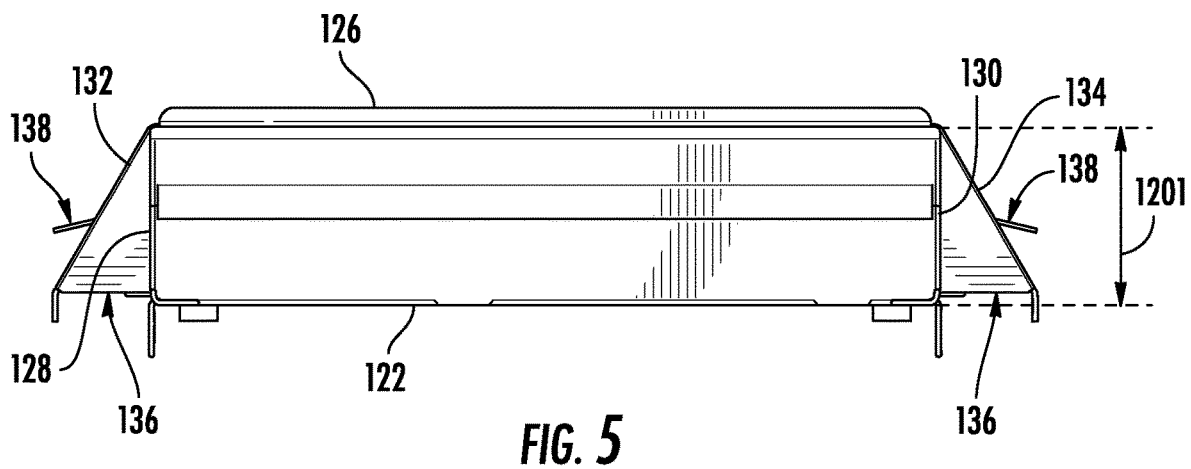
FIG. 5 provides a front view of the exemplary high temperature cooking zone of FIG. 4.

FIGS. 2 and 3 illustrate an interior of oven appliance 10 (e.g., cooking chamber 100), and particularly a high temperature or high heat cooking zone provided within cooking chamber 100. For purposes of this disclosure, the high temperature cooking zone may be defined by and referred to as a cooking accessory 120. However, cooking accessory 120 (including the high temperature cooking zone) may be integrally formed with cooking chamber 100, as will be described below. For instance, cooking accessory 120 may be built-in to cooking chamber 100. FIGS. 4 and 5 illustrate cooking accessory 120 outside of cooking chamber 100. Hereinafter, cooking accessory 120 will be described in detail with reference to FIGS. 2 through 5. Cooking accessory 120 may be receivable within cooking chamber 100 (e.g., as shown in FIGS. 2 and 3). For instance, cooking accessory 120 may be positioned within cooking chamber 100. In at least one embodiment, cooking accessory 120 is provided as bottom wall 32 of cooking chamber 100. In detail, cooking accessory 120 may operate as the divider between cooking chamber 100 and burner housing 106. As will be described below, a top surface or plate of cooking accessory 120 may define a bottom surface of cooking chamber 100. Additionally or alternatively, a bottom surface or base plate 122 of cooking accessory 120 may define a top surface of burner housing 106.

Cooking accessory 120 may form a high heat chamber 121. For instance, cooking accessory 120 may be formed so as to allow a high heat cooking operation to be performed therein (e.g., such as a pizza cooking operation). For instance, high heat chamber 121 may be at least partially separated from cooking chamber 100 (e.g., by one or more plates, panels, or physically isolating elements). However, cooking chamber 100 and high heat chamber 121 may also be in thermal or fluid communication with each other. For instance, heat from burner 112 may first be supplied to cooking accessory 120 (e.g., high heat chamber 121) before flowing with air into cooking chamber 100, as will be described in more detail below.

Cooking accessory 120 may include a base plate 122. Base plate 122 may selectively receive a food item thereon for a cooking operation (e.g., the high temperature cooking operation). Base plate 122 may form a bottom portion of cooking accessory 120 or a bottom portion of high heat chamber 121. According to at least some embodiments, base plate 122 may be capable of reaching elevated temperatures (e.g., equal to or greater than about 800° Fahrenheit). According to some embodiments, base plate 122 may be formed from a metal such as steel, a stone or ceramic, a high heat composite, or the like.

Generally, base plate defines a (e.g., horizontal) cooking surface. When assembled, base plate 122 may extend predominantly along the lateral direction L and the transverse direction T. For instance, a width 1221 of base plate 122 along the lateral direction L may be a predetermined percentage of a width 1001 of cooking chamber 100. Width 1221 of base plate 122 may be between about 50% and about 75% of width 1001 of cooking chamber 100. Thus, base plate 122 may be spaced apart from interior sidewalls 30 of cooking chamber 100. As shown particularly in FIG. 3, for instance, base plate 122 (e.g., cooking accessory 120) may be predominantly centered within cooking chamber 100 (e.g., along the lateral direction L). Advantageously, as will be described in more detail below, heat, heated air, or gas from burner housing 106 may be easily supplied to cooking chamber 100 (e.g., after being supplied to cooking accessory 120).

Cooking accessory 120 may include an enclosing lid 124. Enclosing lid 124 may be disposed or provided over base plate 122. According to some embodiments, enclosing lid 124 is attached to base plate 122 (e.g., at lateral sides thereof). However, in additional or alternative embodiments, enclosing lid 124 is attached to cooking chamber 100 directly (e.g., at the sidewalls or back wall thereof). When assembled, at least a portion of enclosing lid 124 may be spaced apart from base plate 122 by a predetermined distance. In detail, a distance between enclosing lid 124 and base plate 122 may be defined as a height 1201 (e.g., maximum height) along the vertical direction V. Height 1201 may be shorter than width 1221. According to at least some embodiments, the ratio of height 1201 to width 1221 is between about 1:3 and about 1:5.

Enclosing lid 124 may include a top plate 126. For instance, top plate 126 may be disposed above base plate 122 (e.g., along the vertical direction V). Accordingly, height 1201 may be defined between base plate 122 and top plate 126. Top plate 126 may be predominantly parallel with base plate 122. However, according to some embodiments, top plate 126 may be curved. For instance, top plate may be convex upward along the vertical direction V, forming a dome shape over base plate 122. It should be understood that top plate 126 may have any suitable shape (e.g., to form a high heat chamber 121 between top plate 126 and base plate 122.)

Enclosing lid 124 may include a rear wall 140. Rear wall 140 may extend from top plate 126 (e.g., predominantly along the vertical direction V). For instance, rear wall 140 may extend generally downward along the vertical direction V (e.g., toward burner housing 106). Rear wall 140 may extend along the lateral direction L a distance equal to width 1221 of base plate 122. Rear wall 140 may define a rear boundary of high heat chamber 121. Thus, rear wall 140 may be positioned at or near a rear of cooking chamber 100 (e.g., rear 113). Thus, a depth of high heat chamber 121 along the transverse direction T may be maximized.

Enclosing lid 124 may define a main inlet 110. Main inlet 110 may allow fluid communication between burner housing 106 and high heat chamber 121. Thus, main inlet 110 may be an opening within cooking accessory 120 through which heat, heated air, or gas may flow from burner 112 into high heat chamber 121. Main inlet 110 may be defined between rear wall 140 and base plate 122. In detail, rear wall 140 may be spaced apart from base plate 122 along the transverse direction T. The space between rear wall 140 and base plate 122 may be referred to as the main inlet 110. As shown in FIG. 2, main inlet 110 may be positioned proximate burner 112 (e.g., a rear of burner 112). Accordingly, heat or flames released from burner 112 via first gas ports 114 may be directed toward main inlet 110 and into high heat chamber 121.

Enclosing lid 124 may define an access opening 118. Access opening 118 may be defined at a front of enclosing lid 124. For instance, access opening 118 may be defined between top plate 126 and base plate 122. Access opening 118 may allow access to high heat chamber 121. In detail, a user may position food within high heat chamber 121 via access opening 118. Additionally or alternatively, access opening 118 may function as an outlet or a main outlet for heat, heated air, or gas supplied to high heat chamber 121 via main inlet 110. The heat or heated air from burner 112 may enter main inlet 110 from a bottom rear of cooking accessory 120. The heat or heated air may then flow through high heat chamber 121 along the transverse direction T from the rear to a front of high heat chamber 121. The heat or heated air may then exit high heat chamber 121 via access opening 118 and flow into cooking chamber 100.

A front edge 1222 of base plate 122 may be positioned closer to door 20 of oven appliance 10 than a front edge 1262 of top plate 126. For instance, as shown in FIG. 2, base plate 122 may be provided further forward (e.g., along the transverse direction T) than top plate 126. Accordingly, access opening 118 may be defined along the transverse direction T and along the vertical direction V. Advantageously, access opening 118 may be enlarged to allow easy access when supplying cooking products thereto (e.g., food, cooking stones, etc.). Moreover, a gap between front edge 1262 of top plate 126 and door 20 may allow the heat or heated air exiting high heat chamber 121 to flow easily and without obstruction into cooking chamber 100.

Enclosing lid 124 may include a pair of sidewalls. For instance, the pair of sidewalls may include a first sidewall 128 and a second sidewall 130. The pair of sidewalls may be spaced apart from each other along the lateral direction L (e.g., by width 1221). According to at least some embodiments, the pair of sidewalls are connected with rear wall 140. Additionally or alternatively, the pair of sidewalls may extend from top plate 126 toward base plate 122. According to some embodiments, first and second sidewalls 128 and 130 each extend predominantly along the vertical direction V and the transverse direction T. In detail, first and second sidewalls 128 and 130 may be perpendicular to top plate 126 (or bottom plate 122). Additionally or alternatively, first and second sidewalls 128 and 130 may each be connected with base plate 122. In detail, first and second sidewalls 128 and 130 may connect top plate 126 with base plate 122 (e.g., to form high heat chamber 121 therebetween). Thus, a height of the pair of sidewalls along the vertical direction V may be height 1201.

The pair of sidewalls 128 and 130 may include a pair of flanges. In detail, first sidewall 128 may include or define a first flange 132. Second sidewall 130 may include or define a second flange 134. First and second flanges 132 and 134 may be identical to each other while being mirrored about a plane along the vertical direction V and transverse direction T (e.g., parallel with the pair of sidewalls). However, according to some embodiments, first flange 132 and second flange 134 differ from each other (e.g., in style, size, construction, inclusion of apertures, etc).

First flange 132 may extend from top plate 126. In detail, first flange 132 may extend at an angle with respect to top plate 126. According to one embodiment, first flange 132 is provided in addition to first sidewall 128. According to this embodiment, first flange 132 extends at an acute angle with respect to first sidewall 128. For instance, as shown in FIG. 5, first flange 132 may be positioned such that a distance between first sidewall 128 and first flange 132 at a top portion is less than a distance between first sidewall 128 and first flange 132 at a bottom portion (e.g., along the vertical direction V). Accordingly, as will be described below, heat, heated air, or gas supplied from burner housing 106 may be supplied between first flange 132 and first sidewall 128 (and between second flange 134 and second sidewall 130). According to another embodiment, first and second flanges 132 and 134 are provided as first and second sidewalls 128 and 130. In detail, first and second sidewalls 128 and 130 may extend at an obtuse angle with respect to top plate 126.

First side flange 132 may define an auxiliary inlet 136. Auxiliary inlet 136 may be defined along the vertical direction V. For instance, auxiliary inlet 136 may be defined between first flange 132 and first sidewall 128. As mentioned above, burner 112 may include second gas ports 116. The heat or heated air or gas from second gas ports 116 may be supplied initially to an underside of base plate 122. The heat or heated air may thus provide direct heat to base plate 122. The heat or heated air may then flow along the lateral direction L towards auxiliary inlet 136 (i.e., provided at either lateral side at first flange 132 and second flange 134). The heat or heated air may then provide heat to, e.g., first and second sidewalls 128 and 130.

Similarly, second flange 134 may extend from top plate 126. In detail, second flange 134 may extend at an angle with respect to top plate 126. According to one embodiment, second flange 134 is provided in addition to second sidewall 130. According to this embodiment, second flange 134 extends at an acute angle with respect to second sidewall 130. For instance, as shown in FIG. 5, second flange 134 may be positioned such that a distance between second sidewall 130 and second flange 134 at a top portion is less than a distance between second sidewall 130 and second flange 134 at a bottom portion (e.g., along the vertical direction V). Accordingly, as will be described below, heat, heated air, or gas supplied from burner housing 106 may be supplied between second flange 134 and second sidewall 130.

Each of first side flange 132 and second side flange 134 may define an auxiliary inlet 136. Auxiliary inlet 136 may be defined along the vertical direction V. For instance, auxiliary inlet 136 may be defined between first flange 132 and first sidewall 128. As mentioned above, burner 112 may include second gas ports 116. The heat, heated air, or gas from second gas ports 116 may be supplied initially to an underside of base plate 122. The heat or heated air may thus provide direct heat to base plate 122. The heat or heated air may then flow along the lateral direction L towards auxiliary inlet 136 (i.e., provided at either lateral side at first flange 132 and second flange 134). The heat or heated air may then provide heat to, e.g., first and second sidewalls 128 and 130.

First flange 132 may define an auxiliary outlet 138. Auxiliary outlet 138 may be defined through first flange 132 (e.g., along the lateral direction L). For instance, auxiliary outlet 138 may be an aperture defined through first flange 132 (e.g., generally or at least partially along the lateral direction L). Auxiliary outlet 138 may be positioned at or near a midpoint (e.g., along the vertical direction V) of first flange 132. Additionally or alternatively, a height 1381 of auxiliary outlet 132 (e.g., along the vertical direction V) may be a predetermined percentage of height 1201 of cooking accessory 120. For instance, height 1381 of auxiliary outlet 138 may be between about 10% and about 30% of height 1201 of cooking accessory 120.

Auxiliary outlet 138 may include or be provided as a plurality of apertures. For instance, with reference to FIG. 4, auxiliary outlet 138 may include two apertures spaced apart from each other along the transverse direction T. More apertures may be defined for auxiliary outlet 138, such as three, four, six, or eight apertures. Moreover, the plurality of apertures may be spaced apart from each other along the vertical direction V as well as along the transverse direction T. Auxiliary outlet 138 may be in fluid communication with auxiliary inlet 136. Thus, the heat or heated air from burner 112 that flows through auxiliary inlet 136 may in turn flow through auxiliary outlet 138 and into cooking chamber 100. Additionally or alternatively, the flow path between main inlet 110 and accessory opening 118 may be distinct from and in fluid parallel to the flow path between auxiliary inlet 136 and auxiliary outlet 138.

Cooking accessory 120 may include an air deflector 142. Air deflector 142 may be positioned within (or disposed within) high heat chamber 121. For instance, air deflector 142 may extend from a rear edge 1224 of base plate 122 (e.g., into high heat chamber 121). Air deflector 142 may extend along the lateral direction L such that a width of air deflector 142 is equal to or greater than width 1221 of base plate 122. Air deflector 142 may thus form a back stop within high heat chamber 121 (e.g., to prevent food or cooking items supplied to high heat chamber 121 from blocking main inlet 110). Additionally or alternatively, air deflector 142 may guide the flow of heat or heated air from main inlet 110 toward a top of high heat chamber 121 (e.g., toward an underside of top plate 126). Advantageously, the heat or heated air may be circulated within high heat chamber before exiting via access opening 118. Air deflector may have a curved shape (e.g., semicircular) such that a concave portion faces high heat chamber 121. However, it should be understood that a specific shape or profile of air deflector 142 may vary according to specific embodiments.

Cooking accessory 120 may include a front plate 144. Front plate 144 may be provided to selectively cover at least a portion of access opening 118. For instance, front plate 144 may be movably (e.g., rotatably) connected to the pair of sidewalls (or to base plate 122). Accordingly, front plate 144 may function as a door to high heat chamber 121. Front plate 144 may be movable between an open position and a closed position. When in the closed position, a gap may be formed between front plate 144 and top plate 126 (e.g., along the vertical direction V). Thus, the flow of heat or heated air may exit via access opening 118 when front plate 144 is in the closed position. Moreover, front plate 144 may include a handle 146. A user may selectively pull handle 146 to rotate front panel 144 between the closed position and the open position.

As mentioned above, cooking accessory 120 may form high heat chamber 121, in which certain foods may be cooked at relatively higher temperatures than within the cooking chamber 100. For one example, a pizza cooking operation is performed within high heat chamber 121 while a potato roasting operation is performed within cooking chamber 100. According to this example, with direct heat supplied to the interior and exterior of cooking accessory 120, temperatures within high heat chamber may reach up to or exceeding about 1200° F. However, due to the flow of the heat or heated air, the temperature within cooking chamber 100 may remain around or below about 500° F. Thus, dual cooking operations may be performed within oven appliance 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking accessory provided within a cooking chamber of an oven appliance defining a vertical direction, a lateral direction, and a transverse direction, the cooking accessory comprising:
   a base plate to receive a food item thereon;
   an enclosing lid disposed over the base plate, the enclosing lid defining a main inlet and an access opening, the main inlet being defined along the vertical direction and the access opening being defined along the transverse direction,
   wherein the base plate and the enclosing lid form a high heat chamber for the food item, the high heat chamber being in fluid communication with the cooking chamber; and
   an air deflector provided within the cooking chamber, wherein the air deflector extends from the base plate into the high heat chamber to direct hot air introduced to the high heat chamber via the main inlet towards the access opening.

2. The cooking accessory of claim 1, wherein the enclosing lid comprises:
   a top plate disposed above the base plate;
   a pair of sidewalls extending from the top plate towards the base plate; and
   a rear wall extending downward from the top plate towards the base plate, the pair of sidewalls being connected with the rear wall, wherein the main inlet is defined between the base plate and the rear wall.

3. The cooking accessory of claim 2, wherein the pair of sidewalls comprises:
   a first side flange extending from the top plate at an acute angle with respect to a first sidewall of the pair of sidewalls, the first side flange defining a first auxiliary inlet along the vertical direction separate from the main inlet; and
   a second side flange extending from the top plate at an acute angle with respect to a second sidewall of the pair of sidewalls, the second side flange defining a second auxiliary inlet along the vertical direction separate from the main inlet.

4. The cooking accessory of claim 3, wherein the first side flange defines a first auxiliary outlet along the lateral direction, and wherein the second side flange defines a second auxiliary outlet along the lateral direction.

5. The cooking accessory of claim 2, wherein a width of the main inlet along the lateral direction is greater than or equal to a width of the base plate along the lateral direction.

6. The cooking accessory of claim 1, wherein a width of the air deflector along the lateral direction is greater than or equal to a width of the base plate along the lateral direction.

7. The cooking accessory of claim 2, further comprising:
   a front plate extending from the base plate proximate the access opening, the front plate being rotatably attached to the base plate between an open position and a closed position, wherein the access opening is further defined between the front plate and the top plate along the vertical direction when the front plate is in the closed position.

8. The cooking accessory of claim 1, wherein the cooking accessory defines a height along the vertical direction and a width along the lateral direction, and wherein a ratio of the height to the width is between 1:3 and 1:5.

9. An oven appliance defining a vertical direction, a lateral direction, and a transverse direction, the oven appliance comprising:
   a cabinet forming a cooking chamber and a heating element chamber provided below the cooking chamber;
   a heating element provided within the heating element chamber; and
   a cooking accessory positioned between the heating element chamber and the cooking chamber, the cooking accessory comprising:
   a base plate;
   an enclosing lid disposed over the base plate, the enclosing lid defining a main inlet and an access opening, the main inlet being defined along the vertical direction and the access opening being defined along the transverse direction, wherein the cooking accessory forms a bottom panel of the cooking chamber, and wherein the cooking accessory forms a high heat chamber in fluid communication with the cooking chamber; and
   an air deflector provided within the high heat chamber, wherein the air deflector extends from the base plate into the high heat chamber to direct hot air introduced to the high heat chamber via the main inlet towards the access opening.

10. The oven appliance of claim 9, wherein the enclosing lid comprises:
    a top plate;
    a pair of sidewalls extending from the top plate towards the base plate; and
    a rear wall extending downward from the top plate towards the base plate, the pair of sidewalls being connected with the rear wall, wherein the main inlet is defined between the base plate and the rear wall along the transverse direction.

11. The oven appliance of claim 10, wherein the cooking accessory further comprises:
    a first side flange extending from the top plate at an acute angle with respect to a first sidewall of the pair of sidewalls, the first side flange defining a first auxiliary inlet along the vertical direction separate from the main inlet; and
    a second side flange extending from the top plate at an acute angle with respect to a second sidewall of the pair of sidewalls, the second side flange defining a second auxiliary inlet along the vertical direction separate from the main inlet.

12. The oven appliance of claim 11, wherein the first side flange defines a first auxiliary outlet along the lateral direction, and wherein the second side flange defines a second auxiliary outlet along the lateral direction.

13. The oven appliance of claim 10, wherein a width of the main inlet along the lateral direction is equal to a width of the base plate along the lateral direction.

14. The oven appliance of claim 9, wherein a width of the air deflector along the lateral direction is equal to a width of the base plate along the lateral direction.

15. The oven appliance of claim 10, wherein the cooking accessory further comprises:
    a front plate extending from the base plate proximate the access opening, the front plate being rotatably attached to the base plate between an open position and a closed position, wherein the access opening is further defined between the front plate and the top plate along the vertical direction when the front plate is in the closed position.

16. The oven appliance of claim 9, wherein the cooking accessory defines a height along the vertical direction and a width along the lateral direction, and wherein a ratio of the height to the width is between 1:3 and 1:5.

17. The cooking accessory of claim 1, wherein the cooking accessory at least partially divides the cooking chamber of the oven appliance from a burner housing of the oven appliance.

\* \* \* \* \*